United States Patent [19]

Amano

[11] Patent Number: 5,537,172
[45] Date of Patent: Jul. 16, 1996

[54] CAMERA HAVING MAGNETIC RECORDING APPARATUS

[75] Inventor: Kenichiro Amano, Tokyo, Japan

[73] Assignee: Canon Kabushiki Kaisha, Tokyo, Japan

[21] Appl. No.: 376,669

[22] Filed: Jan. 23, 1995

Related U.S. Application Data

[63] Continuation of Ser. No. 83,543, Jun. 30, 1993, abandoned.

[30] Foreign Application Priority Data

Jul. 2, 1992 [JP] Japan ..................................... 4-197450

[51] Int. Cl.⁶ ................................................. G03B 17/24
[52] U.S. Cl. ................................................. 354/106
[58] Field of Search ..................................... 354/105, 106

[56] References Cited

U.S. PATENT DOCUMENTS 4,829,333  5/1989  Inoue et al. ......................... 354/106 X
5,253,001  10/1993  Alyfuku et al. ..................... 354/106

FOREIGN PATENT DOCUMENTS 62-163033  7/1987  Japan.

*Primary Examiner*—Howard B. Blankenship
*Attorney, Agent, or Firm*—Fitzpatrick, Cella, Harper & Scinto

[57] ABSTRACT

This invention relates to a camera for recording preset aspect ratio information on each shot frame.

In this invention, there is provided a camera of this type, which has a first mode for recording the preset aspect ratio information on frames in units of shooting operations, and a second mode for recording specific aspect ratio information regardless of the preset aspect ratio information on frames after the preset aspect ratio information is recorded on the shot frame, and can select one of the first and second modes.

34 Claims, 7 Drawing Sheets

ASPECT RATIO TYPE 1 "H"

FIG. 1A

ASPECT RATIO TYPE 2 "L"

FIG. 1B

ASPECT RATIO TYPE 3 "P"

CAMERA HAVING MAGNETIC RECORDING APPARATUS

This application is a continuation of prior application Ser. No. 08/083,543 filed on Jun. 30, 1993, now abandoned.

BACKGROUND OF THE INVENTION

1. Field of the Invention

The present invention relates to a camera capable of selecting one of a plurality of shooting aspect ratios.

2. Related Background Art

Conventionally, as described in Japanese Laid-Open Patent Application No. 62-163033, a camera which has a trimming shooting mode for designating to print only a partial region in a shooting field, and cancels the trimming shooting mode by a lens change operation, a film change operation, an operation of a main switch (SW), and the like, is proposed.

However, in this prior art, since trimming control means is canceled using the camera state as a signal, if a camera capable of switching a shooting aspect ratio is examined in place of the above-mentioned camera, the camera suffers from the following drawbacks:

(i) Even when a shooting operation is to be continuously performed at the same aspect ratio, the setting value of the aspect ratio is undesirably reset in accordance with the camera state.

(ii) Since the aspect ratio is not reset in units of frames in a single film, an operator cannot be prevented from forgetting to reset the aspect ratio in units of frames. (iii) Since an operator cannot select an aspect ratio as an initial value, an aspect ratio normally used by the operator is undesirably fixed.

SUMMARY OF THE INVENTION

One aspect of the application has as its object to provide a camera, which can select a shooting aspect ratio in units of frames of a film or continuously.

In order to achieve the above object, one aspect of the application provides a camera wherein a shooting aspect ratio is selected and set in setting means, the set aspect ratio information is recorded in each shooting frame, prohibiting means for prohibiting recording of the set aspect ratio information when the camera is set in a predetermined state is arranged, and the operation of the prohibiting means can be manually selected.

Under the above-mentioned object, one aspect of the application provides a camera wherein after the prohibiting means prohibits recording of the set aspect ratio information, specific aspect ratio information is recorded in each frame independently of the set aspect ratio information.

Other objects of the present invention will become apparent from the following description of the embodiment taken in conjunction with the accompanying drawings.

DETAILED DESCRIPTION OF THE PREFERRED EMBODIMENTS

Figure 1A:
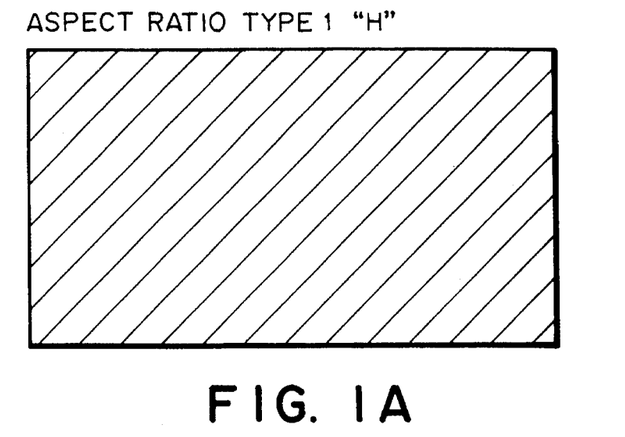
FIGS. 1A to 1C are views for explaining a plurality of aspect ratios.
Figure 1B:
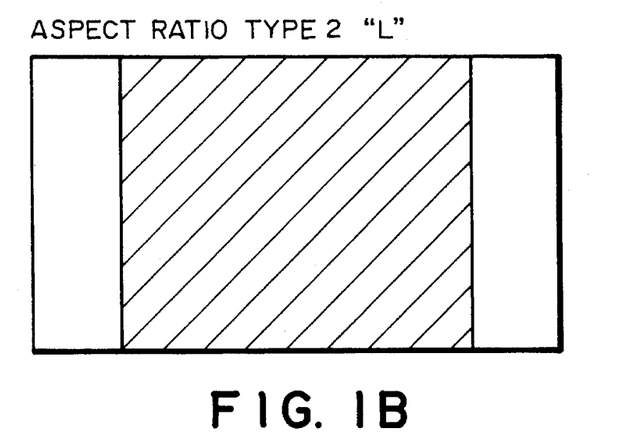
Figure 1C:
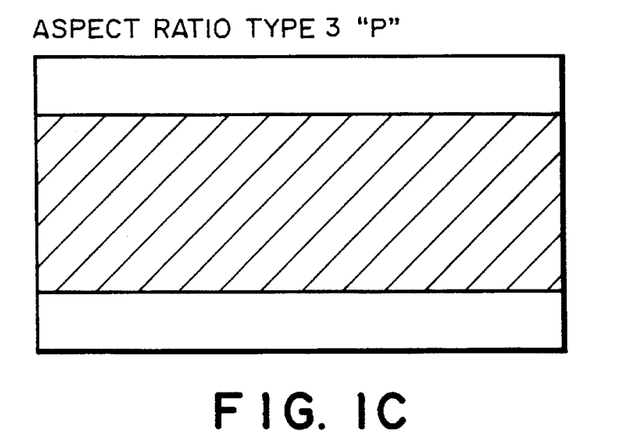

FIGS. 1A to 1C show differences of printed regions of three different aspect ratios.

FIG. 1A shows a region printed in a print mode when an aspect ratio switching value "H" is selected, and a shooting operation is performed. In FIG. 1A, the aspect ratio is about 1:1.8, and the printed region almost corresponds to the entire shooting field of one frame of a film. FIG. 1B similarly shows a region printed in the print mode when an aspect ratio switching value "L" is selected, and a shooting operation is performed. In FIG. 1B, the aspect ratio is about 1:1.5, and the right and left regions of a frame are cut as compared to the aspect ratio "H". FIG. 1C shows a region printed in the print mode when an aspect ratio switching value "P" is selected, and a shooting operation is performed. In FIG. 1C, the aspect ratio is about 1:2.8, and the upper and lower regions of a frame are cut.

Information indicating one of these aspect ratio switching values "H", "L", and "P" is recorded in an information storage portion corresponding to each frame of a film, and a print operation is performed according to the recorded information, thus obtaining a print having a desired aspect ratio.

Figure 2A:
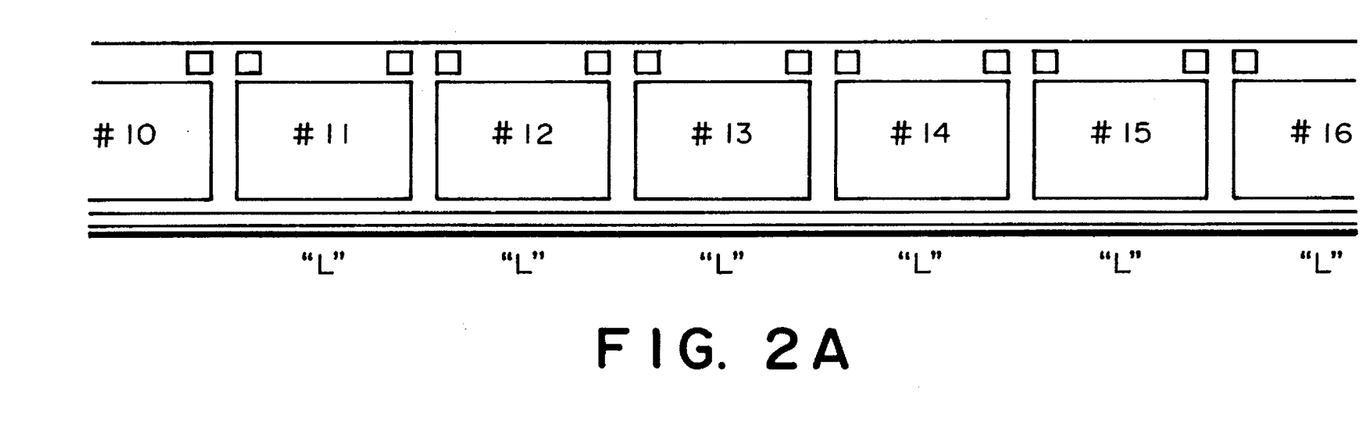
FIGS. 2A and 2B are views showing aspect ratio information recorded on a film.
Figure 2B:
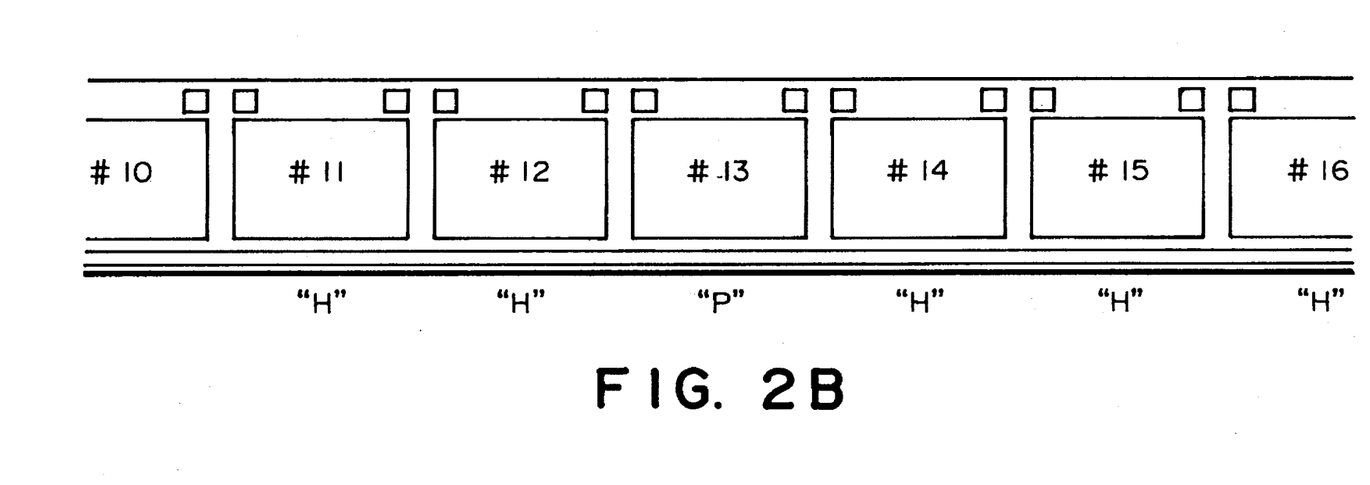

FIGS. 2A and 2B show aspect information recorded on a film.

FIG. 2A shows a case wherein shooting operations of all frames of a single film are performed at the same aspect ratio. FIG. 2B shows a case wherein shooting operations are performed at different aspect ratios in a single film. Each of FIGS. 2A and 2B shows some frames of a film.

In FIG. 2B, the 11th and 12th frames are subjected to shooting operations in the format "H", the 13th frame is subjected to a shooting operation in the format "P", and the 14th to 16th frames are subjected to shooting operations in the format "H" again. In this case, a region to be exposed on each frame of a film is exposed on the frame as a region having a maximum one of the three different aspect ratios (in this case, the format "H"), and the type ("H", "L", or "P") of aspect ratio is recorded as information on an information storage portion corresponding to the frame. In a print mode, the recorded information (the type of aspect ratio) is read, and the region on the corresponding frame is printed at an aspect ratio corresponding to the read information, thus obtaining a desired print.

Figure 3:
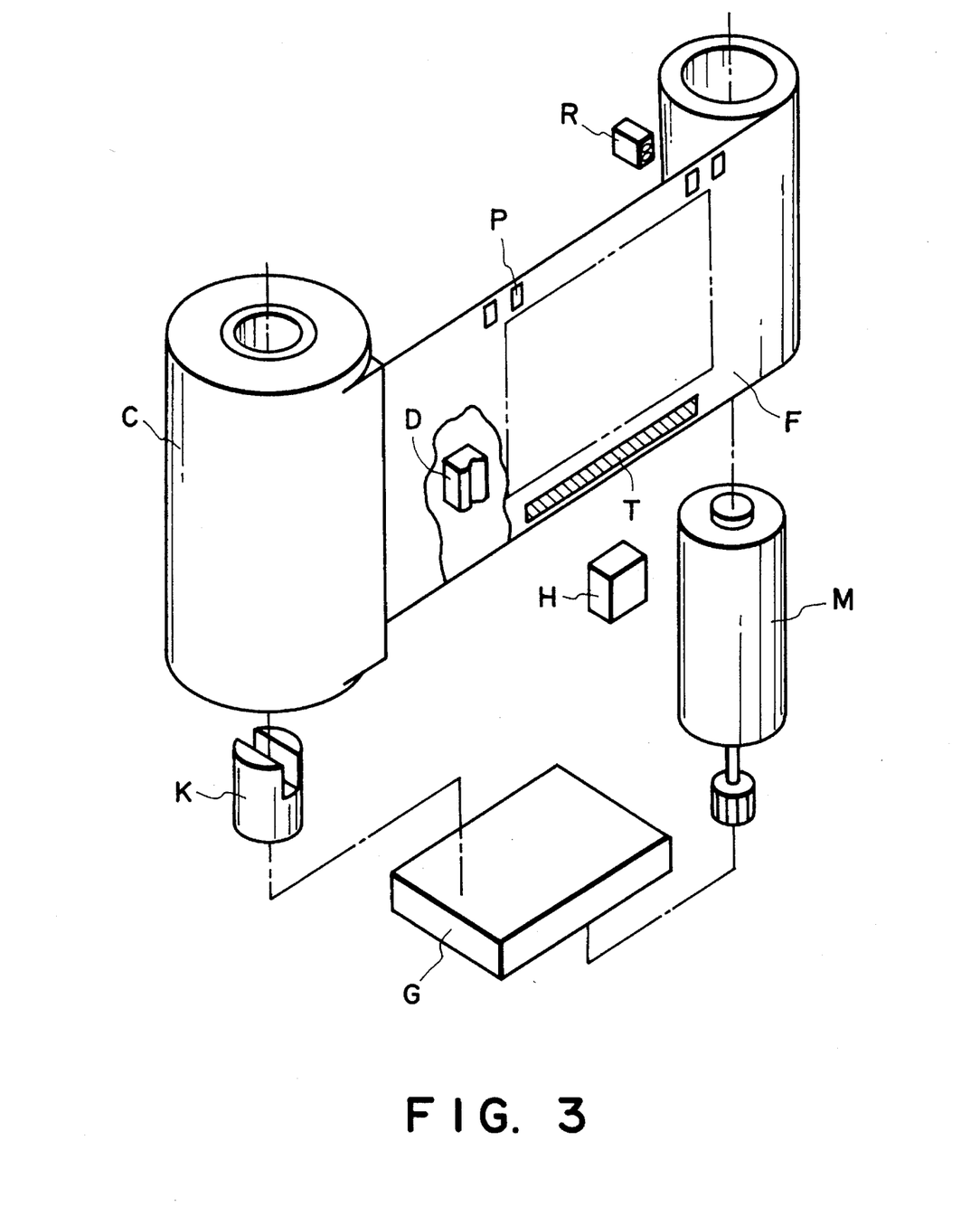
FIG. 3 is a schematic perspective view showing an internal arrangement of a camera used in the present invention.

FIG. 3 is a schematic perspective view showing an internal arrangement of a camera used in the present invention. The camera shown in FIG. 3 comprises a feed photo-reflector R for detecting perforations P of a film F and feeding the film by a predetermined distance, a film feed motor M arranged in a spool, a gear train G for performing deceleration of the film, and switching between a wind-up and rewind operations, a rewind fork K, a film cartridge C, the above-mentioned film F on which a magnetic layer is coated at the base side, a magnetic track T (magnetic storage portion) for recording data such as an exposure condition, a frame number, and the like as magnetic information, perforations P corresponding to the shooting field, a magnetic head H for writing and reading out information on or from the magnetic track T on the film F, and a pressing pad D for pressing the film F against the magnetic head H.

Figure 4:
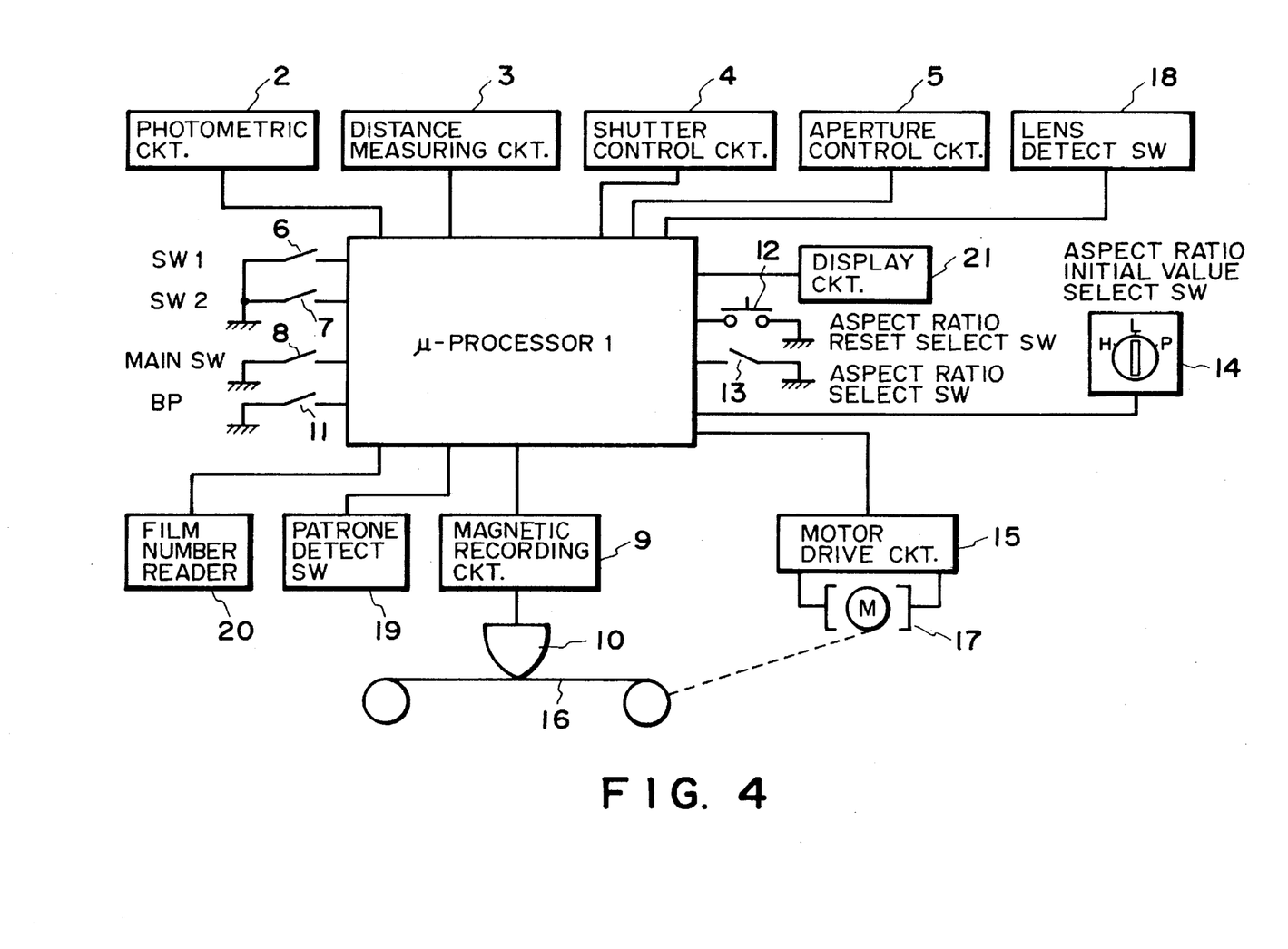
FIG. 4 is a block diagram showing the first embodiment of the present invention.

FIG. 4 is a block diagram showing an embodiment of the present invention. The camera shown in FIG. 4 includes a microprocessor 1 for controlling the camera, a photometric circuit 2, a distance measuring circuit 3, a shutter control circuit 4, and an aperture control circuit 5, which are constituted by known circuits. The cameras also includes a photometry/distance measurement start switch (SW1) 6 and an exposure start switch (SW2) 7, which are respectively turned on at the first and second stroke positions of a release button. The camera further includes a main switch 8, a magnetic recording circuit 9 for writing information on the film, a magnetic head 10 (H in FIG. 3), a back lid open/close detect switch 11, and a select switch 12 for selecting an aspect ratio. Every time the select switch 12 is pushed, the aspect ratio changes like "H", "L", and "P" in turn, and the selected aspect ratio is displayed on a display circuit 21. The camera also includes a switch 13 for selecting whether or not the reset operation of the setting value of the aspect ratio is performed, a select switch 14 for selecting an initial setting value of the aspect ratio, a motor drive circuit 15 for feeding a film 16, a motor 17 (M in FIG. 3), a lens detect switch 18 for detecting that a lens is mounted, a patrone detect switch 19, a film number reader 20 for reading a film number recorded on a film cartridge in the form of, e.g., a bar code, and a display circuit 21 for displaying the setting value of the selected aspect ratio, the frame number, a shutter control value, an aperture value, and the like.

Figure 5:
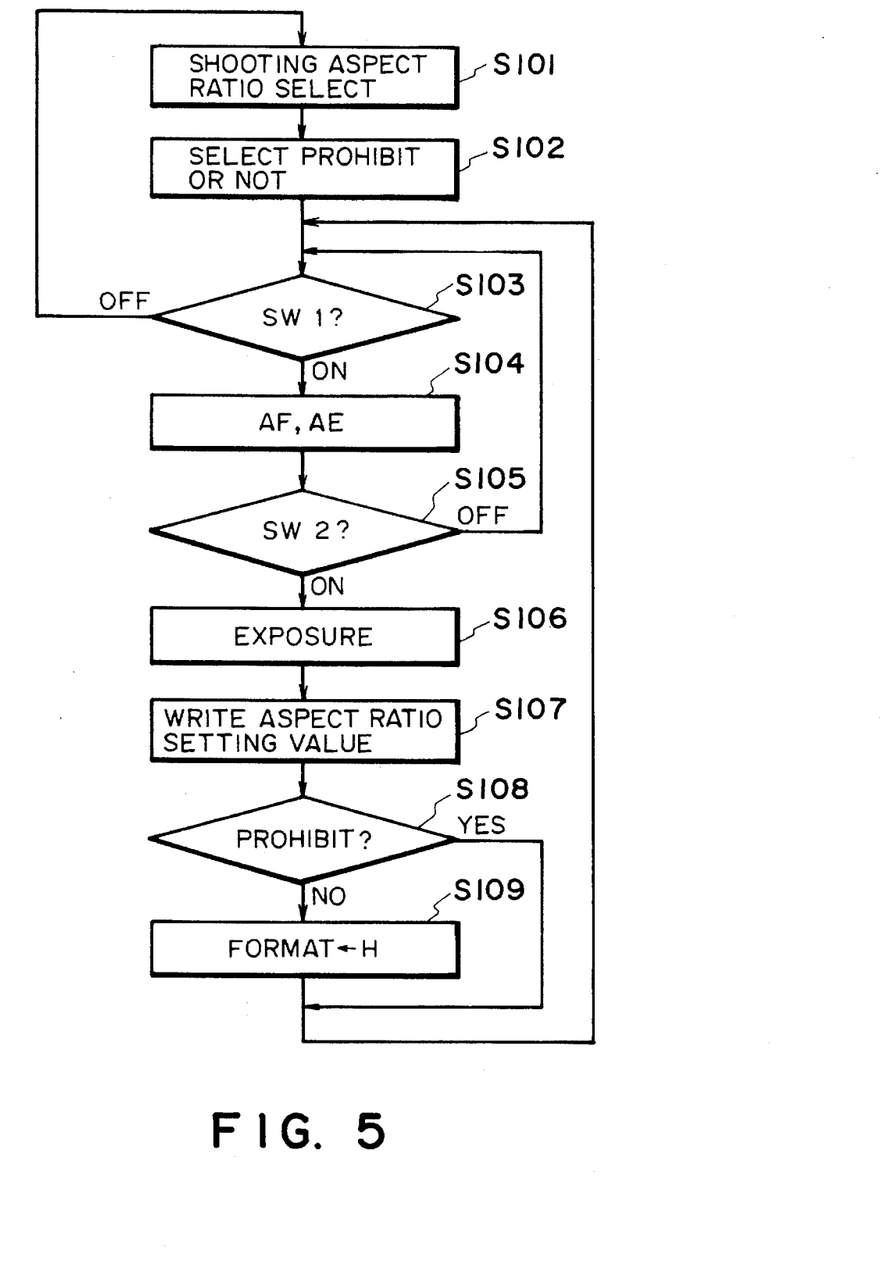
FIG. 5 is a flow chart showing an operation of a microprocessor in the embodiment shown in FIG. 4.

FIG. 5 is a flow chart showing the basic operation of the microprocessor 1 according to the first embodiment of the present invention. The camera shown in FIG. 3 is a pre-wind type camera, which takes up all frames of a film from a cartridge on a take-up spool, and feeds the film frame by frame into the cartridge in a shooting operation. It is assumed that, before execution of the flow chart of FIG. 5, the cartridge is set in the camera, and the pre-wind operation is already performed. In the operation shown in FIG. 5, one of the aspect ratio formats "H", "L", and "P" is selected. In this selection, one of the formats "H", "L", and "P" is selected upon operation of the switch 12, and the selected format information is set (step 101). Then, whether or not the aspect ratio is reset to an initial setting value for each frame is selected. This selection is made by the operation of the switch 13, and whether or not the reset operation is performed is set (step 102). If neither of the photometry/distance measurement start switch 6 (SW1) and the exposure start switch 7 (SW2) are depressed, the operations in steps 101, 102, and 103 are repeated. If the photometry/distance measurement start switch 6 (SW1) alone is depressed, operations in steps 103, 104, and 105 are repeated. Thereafter, AE (automatic exposure) and AF (automatic focus adjustment) calculations are performed (step 104). When the exposure start switch 7 (SW2) is depressed, an exposure operation on the film is performed. After the exposure operation is completed, the film is fed by one frame toward the cartridge (step 106). When the film is fed, the head 10 and the recording circuit 9 are operated, and the setting value information of the aspect ratio selected in step 101 is written in the track of the corresponding frame (step 107). Upon completion of the film feed operation for one frame, the flow advances to step 108 to detect the information set in step 102 so as to determine if it is selected that the aspect ratio is reset to the initial setting value for each frame (step 108). If the reset operation is selected, the aspect ratio is reset to the initial value set by the switch 14 ("H" if "H" is set by the switch 14) (step 109). In this case, since the setting value of the switch 14 is set in place of the information set in step 101, the display circuit 21 displays the setting value of the switch 14. Thereafter, the flow returns to step 103.

If it is determined in step 108 that the reset operation is not selected, the flow returns to step 103 without executing step 109. In this case, the information of the aspect ratio set in step 101 is kept set.

Figures 6, 6A:
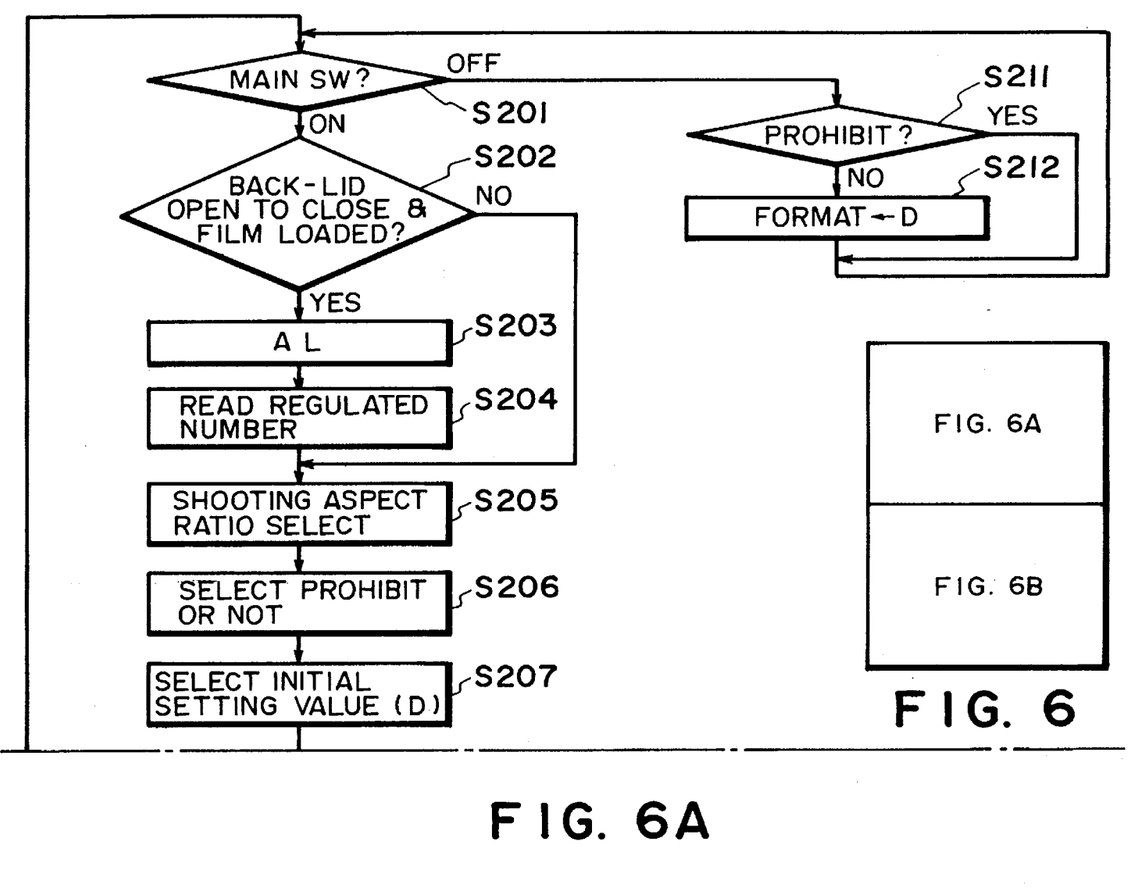
FIG. 6, which consists of FIG. 6A and 6B, is a flow chart showing an operation of the second embodiment of the present invention.
Figure 6B:
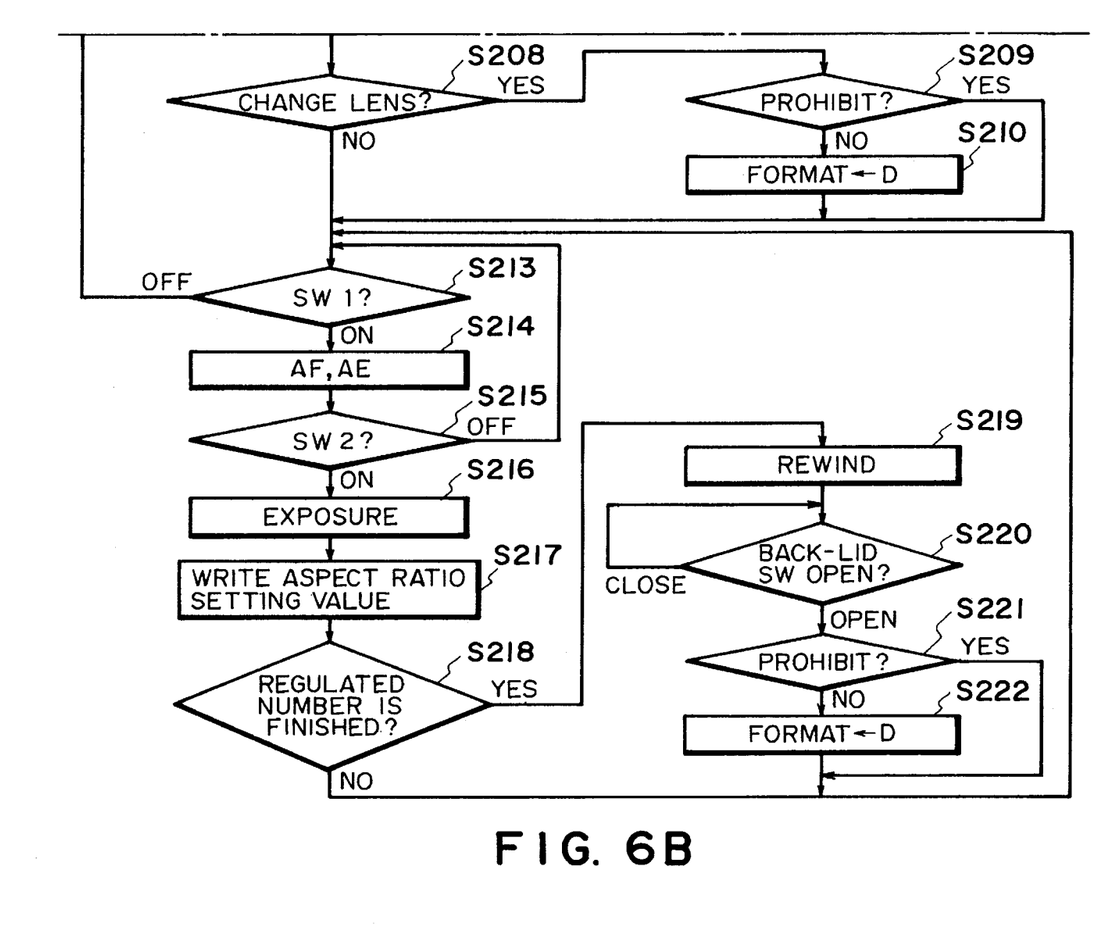

FIGS. 6A and 6B are flow charts showing an operation according to the second embodiment of the present invention. In this case, a camera has an arrangement shown in FIGS. 3 and 4. In FIGS. 6A and 6B, the ON/OFF state of the main switch 8 is detected (step 201). If the main switch 8 is ON, whether or not an auto-loading operation of a film need be performed, i.e., if the back lid is closed from an open state, and wherein the film is loaded is checked on the basis of the back lid open/close detect switch 11 and the patrone detect switch 19. If the back lid is closed, and the auto-loading operation need be performed, a film feed operation (pre-wind operation) is performed (step 203). During this operation, the regulated number of frames of the film is read by the film number reader 20 in step 204. One of shooting aspect ratios, i.e., the formats "H", "L", and "P" is selected (step 205). This operation is performed in the same manner as in step 101 in FIG. 5. Whether or not the aspect ratio is reset to the initial setting value for each frame is selected (step 206). This operation is performed in the same manner as in step 102 in FIG. 5. When the aspect ratio is reset to the initial setting value, the initial setting value is selected from "H", "L", and "P", and the selected value is set as D. This selection is made by detecting the setting value selected by the switch 14. It is then checked if the lens is changed (step 208). If the lens is changed, and if the reset operation is selected in step 206, i.e., it is selected that the aspect ratio is reset to the initial setting value, the information set in step 206 is detected in step 209, and it is determined that the reset operation is not prohibited. In step 210, the aspect ratio is reset to the value selected in step 207. Whether or not the lens is changed can be determined by detecting the ON/OFF state of the lens detect switch which is attached to a camera mount portion (not shown), and is turned on when a lens is mounted. When it is detected that the switch is turned off from an ON state, and is turned on again, it is determined that the lens is changed.

When the ON/OFF operation of the main switch is detected, if the main switch is OFF, it is checked if it is selected that the aspect ratio is reset to the initial setting value (step 211). If such selection is made, the aspect ratio is reset to the value selected in step 207 (step 212). At this time, assume that a routine from step 202 to step 210, when the main switch is ON, has already been executed.

The above-mentioned operation is executed when both the switches SW1 and SW2 are OFF.

When the photometry/distance measurement start switch 6 (SW1) alone is depressed, it is determined in step 213 that the switch 6 is ON, and AE and AF calculations are performed (step 214). Furthermore, when the exposure start switch 7 (SW2) is depressed, it is determined in step 215 that the switch 7 is ON, and an exposure operation on the film and a film feed operation for one frame after exposure are performed (step 216). The selected aspect ratio is written in the film (step 217) as in step 107 in FIG. 5. It is then checked if a shoot number has reached the regulated number read in step 204 (step 218). If the shoot number has reached the regulated number, the rewind operation is performed (step 219), and the control waits based on the state of the switch 11 until the back lid is opened (step 220) Thereafter, it is checked if it is selected that the aspect ratio is reset to the initial setting value (step 221). If such selection is made, the aspect ratio is reset to the value selected in step 207 (step 222), and the flow returns to step 213. However, if it is not selected that the aspect ratio is reset to the initial setting value, the flow returns to step 213 without resetting the aspect ratio.

In the above embodiment, the pre-wind type camera has been exemplified. The present invention can be similarly applied to a normal wind type camera, as a matter of course.

What is claimed is:

1. A camera having recording means for recording information representing a shooting aspect ratio relating to a field size on a recording portion of each frame of a film, comprising:

(a) setting means for setting information relating to the field size;

prohibiting means for prohibiting recording of the information relating to the field size set by said setting means;

(c) first selection means for causing said prohibiting means to operate when a predetermined state of the camera is detected; and (d) second selection means for selecting a non-operation of said prohibiting means independently of said first selection means, wherein the operation of said prohibiting means, by an operation of said first selection means, is prohibited when a state of the non-operation is selected by said second selection means.

2. A camera according to claim 1, wherein the predetermined state is a state representing an ON/OFF operation of a main switch of said camera.

3. A camera according to claim 1, wherein the predetermined state is a state representing an opening/closing operation of a back lid of said camera.

4. A camera according to claim 1, wherein the predetermined state is a state after a lens change operation is performed for said camera.

5. A camera according to claim 1, wherein the predetermined state is a state after a shooting operation is performed.

6. A camera according to claim 1, wherein said recording means records information on a recording medium provided on each frame every time a shooting operation of each frame is performed.

7. A camera according to claim 1, wherein the information relating to the field size is a signal representing a shooting aspect ratio.

8. A camera according to claim 1, wherein said setting means manually selects information relating to a plurality of different field sizes and sets the information.

9. A camera according to claim 1, wherein the information relating to the field size is information relating to a field size being printed.

10. A camera having recording means for recording information relating to a field size on a recording portion of each frame of a film, comprising:

(a) setting means for setting information relating to the field size;

(b) recording control means for causing said recording means to record the information relating to the field size set by said setting means every time a shooting operation of each frame is performed;

(c) reset means for resetting the information relating to the field size set by said setting means when the shooting operation of a frame is performed; and (d) selection means for selecting an operation or a non-operation of said reset means.

11. A camera according to claim 10, wherein the information relating to the field size is a signal representing a shooting aspect ratio.

12. A camera according to claim 10, wherein said setting means manually selects information relating to a plurality of different field sizes and sets the information.

13. A camera according to claim 10, wherein the information relating to the field size is information relating to a field size being printed.

14. A camera having recording means for recording information relating to a field size on a recording portion of each frame of a film, comprising:

(a) a setting circuit for manually selecting information relating to a plurality of different field sizes and for setting the information;

(b) recording control means for prohibiting recording of the information relating to the field size set manually and for recording the information relating to a specific field size;

(c) first selection means for causing said recording control means to operate when a predetermined state of the camera is detected; and (d) second selection means for selecting a non-operation of said recording control means independently of said first selection means, wherein the operation of said recording control means, by an operation of said first selection means, is prohibited when a state of the non-operation is selected by said second selection means.

15. A camera according to claim 14, wherein the predetermined state is a state representing an ON/OFF operation of a main switch of the camera.

16. A camera according to claim 14, wherein the predetermined state is a state representing an opening/closing operation of a back lid of the camera.

17. A camera according to claim 14, wherein the predetermined state is state after a lens change operation is performed for the camera.

18. A camera according to claim 14, wherein the predetermined state is a state after a shooting operation is performed.

19. A camera according to claim 14, wherein the information relating to the field size is a signal representing a shooting aspect ratio.

20. A camera according to claim 14, wherein the information relating to the field size is information relating to a field size being printed.

21. A camera having recording means for recording information relating to a field size on a recording portion of each frame of a film, comprising:

(a) setting means for setting information relating to the field size;

(b) change means for changing information to be recorded on a next frame after a recording of the set information is finished into information which is independent of the set information, relating to a specific field size; and (c) selection means for selecting an operation or a non-operation of said change means, wherein the set information is recorded on each frame when the non-operation of said change means is selected, and the information which is independent of the set information relating to the specific field size is recorded on a next frame after a frame on which the set information is recorded when the operation of said change means is selected.

22. A camera according to claim 21, wherein the information relating to the field size is a signal representing a shooting aspect ratio.

23. A camera according to claim 21, wherein said setting means manually selects information relating to a plurality of different field sizes and sets the information.

24. A camera according to claim 21, wherein the information relating to the field size is information relating to a field size being printed.

25. A camera having recording means for recording information relating to a field size on a recording portion of each frame of a film, comprising:
   (a) a first setting circuit for manually selecting information relating to a plurality of different field sizes and for setting the information;
   (b) recording means for recording the information set by said first setting circuit to each frame;
   (c) a second setting circuit for manually selecting information relating to a plurality of different field sizes and for setting the information; and
   (d) switching means for switching the information, which is recorded by said recording means when the camera enters into a predetermined state, from information set in said first setting circuit to information set in said second setting circuit.

26. A camera according to claim 25, wherein the information relating to the field size is a signal representing a shooting aspect ratio.

27. A camera according to claim 25, wherein the information relating to the field size is information relating to a field size being printed.

28. A camera according to claim 25, wherein the predetermined state is a state representing an ON/OFF operation of a main switch of the camera.

29. A camera according to claim 25, wherein the predetermined state is a state representing an opening/closing operation of a back lid of the camera.

30. A camera according to claim 25, wherein the predetermined state is a state after a lens change operation is performed for the camera.

31. A camera according to claim 25, wherein the predetermined state is a state after a shooting operation is performed by the camera.

32. A camera having recording means for recording information relating to a field size on a recording portion of each frame of a film, comprising:
   (a) setting means for setting information relating to the field size;
   (b) an information recording controlling circuit, said circuit having a first mode in which said circuit records set information on each frame, and a second mode in which said circuit prohibits a recording of the set information on a next frame after a frame on which the set information is recorded; and
   (c) selection means for selecting the first mode or the second mode in accordance with a mode set by a manual operation for setting the mode.

33. A camera according to claim 32, wherein the information relating to the field size is information relating to a field size being printed.

34. A camera according to claim 32, wherein the information relating to the field size is a signal representing a shooting aspect ratio.

* * * * *

UNITED STATES PATENT AND TRADEMARK OFFICE
CERTIFICATE OF CORRECTION

PATENT NO.   : 5,537,172
DATED        : July 16, 1996
INVENTOR(S)  : KENICHIRO AMANO It is certified that error appears in the above-indentified patent and that said Letters Patent is hereby corrected as shown below:

COLUMN 5

Line 3, "220)" should read --220).--.

COLUMN 6

Line 38, "is" (first occurrence) should read --is a--.

Signed and Sealed this

Fifth Day of November, 1996

Attest:

BRUCE LEHMAN

*Attesting Officer*    *Commissioner of Patents and Trademarks*